UNITED STATES PATENT OFFICE.

E. E. MARCY, OF NEW YORK, N. Y.

IMPROVEMENT IN INDIA-RUBBER FABRICS.

Specification forming part of Letters Patent No. 26,358, dated December 6, 1859.

*To all whom it may concern:*

Be it known that I, E. E. MARCY, of the city of New York, in the State of New York, have invented a new and improved fabric or compound of india-rubber which will cause it to retain permanent elasticity and withstand changes of temperature and emit no unpleasant odor; and I declare the following is a true description of the same.

The nature of my invention consists in producing a new fabric by curing india-rubber, when combined with the hyposulphite of zinc, by submitting the compound to the action of steam or water at a high temperature. I procure the hyposulphite of zinc in the following manner, which is the best mode known to me, although it may be produced by other means:

I boil flowers of sulphur in a solution of caustic of soda, or sal-soda, or caustic potash, soda-ash, or lime so long as any sulphur is dissolved. Then pour off the clear yellow liquid and add it to a solution of one of the salts of zinc. The result of this is a white precipitate, which is the hyposulphite of zinc. I pour off the supernatant liquor from the precipitate. Then dry it and grind it to an impalpable powder. In this form I mix it with india-rubber in the proportion of two parts of india-rubber, by weight, to one part of the hyposulphite of zinc. This proportion may be varied with good results; but it is the best known to me. The india-rubber and the hyposulphite in the form of powder are then combined by being passed between heated rollers or grinders in the usual mode of preparing and manufacturing india-rubber. After the mixture is thoroughly combined it may be spread upon cloth or rolled into sheets or put into any other required form for use. It should then be subjected to the action of steam or water at a high temperature by being placed in a vessel containing steam at a heat from 240° to 350° Fahrenheit, or containing water or water and steam at the same high temperature.

It may be necessary for the thorough curing of some articles to increase the temperature beyond the degree indicated; but the degree of temperature and the length of time that the compound must be submitted to the heat will depend, to a certain extent, upon the size and quality of the fabric, but the temperature will in no case be carried so high as to liberate sulphur from the compound above described.

The application of heat by means of steam or water may be made by any of the well-known processes in the manufacture of india-rubber, and must be made by such means, as the compound will not cure satisfactorily in dry air at any temperature.

The result of this process will be the improved fabric possessing the valuable properties before mentioned.

Other substances may be mixed and ground up with this compound for the purpose of increasing its bulk and hardening it and for giving the fabrics color and other properties well known to india-rubber manufacturers; but such articles have no effect in producing the result I have described. Such ingredients are well known to manufacturers of india-rubber, and may be used in connection with my discovery.

I do not claim the curing of india-rubber as specified in the patent of Tyer and Helm, dated January 30, 1849, and reissued August 7, 1849, and May, 1859, nor as described in the patent of J. T. Trotter, December 3, 1850; nor do I claim the process of Charles Goodyear as set forth in his original patent of June 15, 1844, and reissued December 25, 1849; but What I do claim as my invention, and desire to secure by Letters Patent, is—

The improved india-rubber fabric, made by the combination of india-rubber with hyposulphite of zinc and by the exposure of the said compound to steam or water at the temperature hereinbefore stated, substantially as described, without any admixture of free sulphur.

E. E. MARCY.

Witnesses:
W. J. A. FULLER,
JOHN A. SCONCIA.